United States Patent

[11] 3,619,151

| [72] | Inventors | Herbert D. Sheets, Jr.;<br>Martin J. O'Hara, both of Columbus, Ohio |
|---|---|---|
| [21] | Appl. No. | 768,184 |
| [22] | Filed | Oct. 16, 1968 |
| [45] | Patented | Nov. 9, 1971 |
| [73] | Assignee | Landis Tool Company<br>Waynesboro, Pa. |

[54] PHOSPHATE BONDED GRINDING WHEEL
7 Claims, No Drawings

[52] U.S. Cl. .................................................. 51/307, 51/309
[51] Int. Cl. ...................................................... B24d 3/02
[50] Field of Search ........................................... 51/295, 307, 308, 309

[56] References Cited
UNITED STATES PATENTS

| 1,987,861 | 1/1935 | Milligan et al. ............... | 51/308 |
| 2,420,859 | 5/1947 | Buckner ....................... | 51/307 |
| 2,541,658 | 2/1951 | Masin et al. .................. | 51/308 |
| 3,071,456 | 1/1963 | Cheesman..................... | 51/307 |
| 3,429,080 | 2/1969 | Lachapelle ................... | 51/307 |

Primary Examiner—Donald J. Arnold
Attorney—Diller and Brown

ABSTRACT: An abrasive grit/phosphoric acid/fine alumina molding composition, containing at least 0.4 percent by weight of finely divided ferric oxide for cold-pressing and subsequent heat-curing to a body containing abrasive grit particles held together by a water-insoluble phosphate binder; preparation of the body through employment of said amount of the ferric oxide particles with the subsequent heat-curing including a precuring of cold-pressed molding composition at 170° F. to 250° F. for ¾ to 3 hours; and the abrasive body thereby produced.

PHOSPHATE BONDED GRINDING WHEEL

This invention relates to preparation of a useful abrasive body comprised of abrasive grit particles held together by a water-insoluble phosphate binder. More particularly, this invention concerns providing adequate green strength for subsequent preparation processing in a cold-pressed, not-fully-cured, interim body through employment in its formulation of finely divided ferric oxide in a requisite amount with particular materials and amounts and process steps and their sequence of essence to the invention.

Useful abrasive bodies comprised of abrasive grit particles held together by a binder and/or matrix of another material are well known. In the form of grinding wheels, coated surfaces, abrasive tips and/or tool inserts, and the like, they are used for removing material, deburring, grinding, smoothing, polishing, and like operations in preparing useful articles. As exemplary of such useful-abrasive bodies, grinding wheels are known to comprise abrasive grit particles, such as synthetic alumina, emery, corundum, silicon carbide, etc., held together by a binder and/or matrix material, such as glass or 55–57. other vitrified material, various metals, rubber, shellac or other natural resins, oxychlorides, synthetic resins or other resinoid material, etc. In many grinding wheels, the particular material holding the abrasive particles together is the reaction product of a phenolformaldehyde thermosetting plastic reacted to its infusible resinoid state. In a few instances the art mentions abrasive bodies which include a binder of a phosphate material, for example such as illustrated by the preparation disclosed in example IV of British Pat. No. 1,018,401 wherein a mixture of alkali dihydrogen phosphates, fine alumina, and corundum is molded into a grinding wheel. In the art of refractory castables, there are teachings of refractory grog being bonded together by phosphoric acid and alumina, for example such as illustrated by the teachings in U.S. Pat. No. 1,949,038; American Ceramic Society Bulletin, Vol. 35, pages 217-23 (1956); and Brick and Clay Record, 133, July 1958, pages 55/-57.

Although not clearly apparent from the prior art, a major difficulty encountered in preparation of abrasive bodies of desired shape and configuration is an extremely poor and low green strength in cold-pressed masses of those molding compositions which subsequently are heat-cured to provide water-insoluble phosphate bonds therein for holding together the abrasive particles. This fragility and lack of a suitable green strength necessitates extreme care in processing and handling of the cold-pressed and uncured masses. To avoid crack-formation, breakage, and chipping of the mass, frequently requires that the cold-pressed mass be cured to completion in the mold itself with an attendant tying up of the mold from any cold-pressing of additional masses during the subsequent heat cure and also increase heating requirements in that the mold itself also must be heated along with the mass being cured, and additionally results in other disadvantages detracting from economical preparation of abrasive bodies comprised of abrasive grit particles held together by a water soluble phosphate bond.

The present invention minimizes and overcomes many of those just-discussed deficiencies, disadvantages, and detriments holding back ready production and commercialization of abrasive bodies comprised of water-insoluble phosphate binders. Also in contrast to art teachings of grinding wheels containing phosphate bonds produced through using alkali dihydrogen phosphates, the present invention employs phosphoric acid and only in relatively minor amounts in comparison to the major amount of employed abrasive grit particles. In contrast to teachings in the refractory castable art, the present invention employs limited amounts of phosphoric acid and also limits the maximum premissible free water content so as to provide pourable and flowable molding compositions capable of cold-pressing to homogenous masses of substantially uniform density throughout and even to a fraction of the dense structures generally employed in the refractory costable art. In contrast to both the abrasive art and castable refractory art, the present invention employs fine ferric oxide particles in requisite amount in the molding composition so as to permit adequate green strength to be obtained in a relatively short time at moderate temperatures and thus facilitates preparation in an economic manner of the abrasive article. Other and additional advantages and art differences also will be apparent from that which follows.

The invention comprises: employing a preprepared mixed oxides blend of fine alumina particles and finely divided ferric oxide; mixing thoroughly that preprepared mixed oxides blend with a just-prepared blend of abrasive grit particles and phosphoric acid, in which the phosphoric acid is thoroughly mixed and is wetting the abrasive grit particles, to prepare a pourable and flowable molding composition; and cold pressing and precuring at moderate temperatures that molding composition to provide adequate green strength for a subsequent high-temperature curing providing the abrasive body of abrasive grit particles held together by a water-soluble phosphate bond.

More particularly and for preferred practice of the invention, the preparation of a useful abrasive article comprises: (a) preblending form 25 to 15 parts by weight of minus 325 mesh alumina particles with ferric oxide particles of less than 3 micron size in an amount of at least 0.4 part by weight and up to about one-third the amount of the minus 325 mesh alumina particles; (b) preblending from 62 to 78 parts by weight of abrasive grit particles selected from grit-size particles of alumina and silicon carbide with from 11 to 6 parts by weight of phosphoric acid of a free water content of less than 3 percent by weight of the molding composition; (c) thoroughly mixing the prepared preblends of the (a) and (B) steps with each other to provide a molding composition; (d) cold-pressing the molding composition within 12 hours of the (c) step into that shaped configuration and approximate density desired for the abrasive body; (e) precuring the cold-pressed mass resulting from the (D) step at a temperature between 170° to 250° F. for three-quarter to 3 hours; and (f) final curing of the precured mass from the (e) step by raising its temperature gradually over a period of not less than 1 hour to 600° F. at a rate no greater than 600° F. per hour and maintaining a temperature thereabove for at least two hours and until a substantially water-insoluble phosphate binder is formed.

Useful molding composition formulations generally contain a major proportion of abrasive selected from the group of abrasive materials consisting of synthetic and natural aluminum oxides (alumina) and silicon carbide. The abrasive is employed in the form of grit particles of that size grade or gradations requisite for the particularly intended application of the abrasive body being prepared therefrom. The employed abrasive grit particles constitute on a weight basis between 90 to 30 percent of the molding composition formulation and preferably between 62 and 78 percent thereof. Useful abrasive particle grit sizes generally fall within the range of 8 to 240 grit number when the abrasive body is to be a grinding wheel. Finer grit sizes are useful in preparing lapping and polishing wheels. Preferably at least 60 percent by weight of the employed abrasive grit particles fall within the range of 16 to 120 grit numbers, and especially preferred is No. 60 grit-size alumina of which 100 percent of the particles pass through a No. 40 mesh sieve, and a maximum of 5 percent thereof are retained on a 100 mesh sieve (U.S. Standard Sieve).

The balance of the molding composition formulation predominantly is of those materials which upon heat-curing provide an insoluble phosphate bonding matrix for the abrasive grit particles. It constitutes from 10 to 70 percent by weight of the molding formulation and preferably constitutes from 38 to 22 percent by weight thereof, with the larger amounts most useful when employing smaller amounts of grit in the abrasive body. The essential constituents in this balance for providing the bonding matrix are phosphoric acid, fine alumina particles, and finely divided ferric oxide ($Fe_2O_3$).

One part by weight of phosphoric acid generally is employed in the formulation for each 4 to 25 parts by weight of the employed abrasive grit particles with the preferred weight ratio of phosphoric acid/abrasive grit particles falling between about 1:10 to 1:13. On a weight basis there generally is employed in the formulation one part of finely divided ferric oxide for about each 6 to 80 parts of fine alumina particles with a preferred weight ratio of ferric oxide/fine alumina falling between 1:12 to 1:25, and with the molding composition always including a minimum amount of at least 0.4 percent of the finely divided ferric oxide.

The term "phosphoric acid" as used herein is intended to encompass and include (a) orthophosphoric acid, (b) mixtures containing at least 40 percent by weight of orthophosphoric acid with pyrophosphoric acid, tripolyphosphoric acid, and other like higher polymeric phosphoric acids, and (c) aqueous solutions of (a) and (b) of limited free water content. The useful aqueous solutions, employed in the molding composition, should be of a low free water content and a high enough phosphoric acid concentration that in their employed amount the free water therein constitutes less than about 3 percent by weight of the molding composition formulation.

The fine alumina particles employed in the formulation generally are of a particle size of less than 325 mesh (U.S. Sieve Series). The employed ferric oxide is finely divided and most desirably of a particle size of less than about 3 microns. When employing the minimum amount, an extremely small portion thereof, up to about 5 percent of the minimum amount can be of larger particle sizes, and when employing amounts greater than the minimum amount larger proportions can be of particles greater than 3 microns.

All essential constituents for providing the bonding matrix are of at least commercial purity, desirably of high purity, and most desirably at least 99 percent or better pure. The useful molding composition on an optional basis may include up to several percent, to about 5 percent, by weight of an inorganic filler material, such as expanded perlite (sodium potassium aluminum silicate), asbestos fibers, and the like as well as up to several percent by weight of ceramic bond strengthening agents, wetting and/or dispersing agents, and other materials as will be obvious to those in the art.

The molding composition formulations most generally useful and particularly preferred for preparation of useful abrasive bodies are set forth below:

MOLDING COMPOSITION FORMULATIONS*

|  | Generally Useful | Preferred |
| --- | --- | --- |
| Abrasive Grit | 90–30 | 62–78 |
| Phosphoric Acid | 3–21 | 11–6 |
| −325 mesh Alumina Particles | 6–46 | 25–15 |
| Finely divided Ferric Oxide | 0.4 up to about one-third the parts of the −325 mesh alumina | 2–1 of −3 micron size particles |
| Other (e.g., fillers, etc.) | 0–10 | 0–5 |
| To total | 100 | 100 |

*Parts by weight

The molding composition is prepared as by muller-mixing or the like of the employed amounts of finely divided ferric oxide and fine alumina particles together to provide a thoroughly mixed blend of mixed oxide fine particles. The employed amounts of abrasive grit particles and phosphoric acid are mixed and blended together until the surfaces of the abrasive grit particles are well wetted by the phosphoric acid such as by mixing together for several minutes by a rapidly moving, bladed-cage mixer or the like. Then these two prepared blends, generally immediately after their preparation, are mixed thoroughly together. The blend of mixed oxide fine particles remains useful when stored under dry conditions for periods of weeks and months or longer, and the phosphoric acid/abrasive grit particle blend is of utility for up to about three days and even somewhat longer if stored under dry nitrogen at temperatures no higher than about 85 F. The mixing of the two blends may be accomplished as by mixing both together with a rapidly moving, bladed-mixer means for several minutes to provide a relatively dry, pourable and flowable, molding composition.

Usually within one hour of the preparation of the molding composition it is cold-pressed into the desired configuration and shape of the abrasive body. This cold-pressing operation should be accomplished within about 12 hours of preparation of the molding composition's preparation for there is some tendency to set or cure to some extent at normal temperature 25° C. so that thereafter cold-pressing to a body of substantial uniform density throughout is troublesome, if not impossible. Storage of the molding composition in a cool dry atmosphere until cold-pressed will assist in retaining and prolonging its period of usefulness. The cold-pressing operation of the molding composition generally is accomplished by placing a predetermined weighed charge of the molding composition in a mold cavity and pressing, as with a pressurized ram, to a predetermined stop so as to provide a cold-pressed mass in which the abrasive grit particles constitutes a desired percent by volume thereof.

Following cold-pressing of the molding composition to provide a green (substantially uncured) mass of the desired configuration and shape of the abrasive body, this green mass is precured at moderate temperatures to impart thereto a green strength adequate for subsequent handling and final curing thereof. This precure can be accomplished by heating the green mass to about 180° F. for about 2 hours, although temperatures of 170° F. to 250° F. for times of three-quarter to 3 hours are useful for the precure with the longer precure heating times generally employed at the lower useful temperatures. The precuring time and temperature should be such as to cause the ferric oxide content within the green mass to react and form iron phosphates therein. The iron phosphates, which form, provide the green mass with a suitable green strength to maintain the integrity of the body during the subsequent handling and final curing. In the absence of ferric oxide content and formation of iron phosphates, extreme care must be taken in handling and processing of the green mass to the cured abrasive body in order to avoid breakage and fracture. Also, in the absence of iron oxide, no significant setting of the pressed mass occurs at the precure temperatures. Where the employed phosphoric acid contains little or no free water and the cold-pressing is to a green mass containing above about 40 percent by volume of the abrasive grit, it generally is possible by careful handling to remove the center core and shell which form the mold in which the mass was cold-pressed and then proceed directly to the heating requisite for the final cure with the mass resting on the mold base plate. In such instances the other mold parts, e.g., center core and shell, become immediately available for mold assemblage and cold-pressing of additional green masses. In other instances, particularly where the green masses are cold-pressed only to an extent providing lightweight masses containing numerous voids, it is desirable to precure such a fragile mass directly within its mold by exposing the same to requisite precuring time and temperatures. In these instances, following the precure, the green mass is now of adequate green strength to permit removal of center core and mold shell and to support its own shape during the final cure eliminating the necessity of packing the mass in a refractory material.

The precured green mass now is finally cured by raising its temperature at a rate no greater than about 600° F. per hour to a temperature of at least 600° F. and maintained at this elevated temperature for at least 2 hours and until a substantially water-insoluble phosphate binder forms.

For both the precuring and the final curing there is considerable leeway in choice of useful heating means and apparatus. For example, the curing may be accomplished in electrically, gas, or steam-heated ovens and the atmosphere therein may be air, inert gas, or the like as each has been found to be useful.

The compositions on a percent by volume basis of the most generally useful and particularly preferred cure abrasive bodies are set forth below:

ABRASIVE BODY COMPOSITION*

|  | Generally useful | Preferred |
|---|---|---|
| Abrasive Grit | 30-60 | 45-56 |
| Phosphate Bonding Matrix | At least 8 and up to the balance | 20-28 |
| Voids | Up to 45 | Balance |
| Other (e.g., Fillers, etc., | 0-45 | 0-10 |
| To Total | 100 | 100 |

*Percent by volume

In general, the most useful grinding wheels also contain between 30 and 60 percent by volume of abrasive grit particles with the balance of the grinding wheel's volume made of a phosphate bonding matrix and voids. Illustrative optimum and preferred grinding wheels employing about a No. 60-grit size abrasive contain:

Grinding Wheel Composition
Abrasive Grit
    Percent by Volume

| Identification Abrasive Grit | Bonding Matrix | Voids |
|---|---|---|
| No. 60 grit, 45-56 $Al_2O_3$ | 15-15 | Balance |
| No. 60 grit, 45-56 SiC | 20-35 | Balance |

During the precure and final cure, various forms of iron and aluminum phosphates occur to impart bonding of the mass. At low temperatures, below 250° F., the acid reacts with the iron oxide to form bonding iron phosphate phases, a major phase being $Fe(H_2PO_4)_3$. The reaction of the acid with alumina is not appreciable during the precure treatment.

In the final cure, the excess acid, which does not react with the $Fe_2O_3$, is thought to react with the fine alumina powder and alumina grit, when used, according to the following reactions::

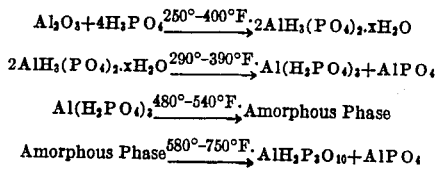

$$Al_2O_3+4H_3PO_4 \xrightarrow{250°-400°F} 2AlH_3(PO_4)_2 \cdot xH_2O$$

$$2AlH_3(PO_4)_2 \cdot xH_2O \xrightarrow{290°-390°F} Al(H_2PO_4)_3+AlPO_4$$

$$Al(H_2PO_4)_3 \xrightarrow{480°-540°F} \text{Amorphous Phase}$$

$$\text{Amorphous Phase} \xrightarrow{580°-750°F} AlH_2P_3O_{10}+AlPO_4$$

After curing to a temperature above about 600° F., the bonding aluminum phosphate phases become relatively insoluble in hot 180° F. water. Also, an amorphous and a crystalline phase $Fe_4(P_2O_7)_3$, of iron phosphate are produced in the final cure to provide relatively insoluble bonding phases. All indications are that the cures abrasive body has its abrasive grit particles held together by a water-insoluble phosphate binder which consists essentially of aluminum phosphates and a minor amount of iron phosphate(s) intermingled therewith.

For illustrations of preferred practices of the invention, reference is made to the following examples:

EXAMPLE A

A blend of abrasive and phosphoric acid is prepared from about 963 parts by weight of No. 60 grit-size alumina and about 80 parts by weight of commercially available about 105 percent phosphoric acid, such as Monsanto Chemical Company's PHOSPHOLEUM, which is 105 percent phosphoric acid consisting essentially of an equilibrium mixture of about 58 percent by weight of orthophosphoric acid, 38 percent by weight of pyrophosphoric acid, 3.5 percent by weight of tripolyphosphoric acid, and a trace of higher polymer acids. This blend is prepared by mixing both components together until the alumina grit is well wetted by the phosphoric acid and thoroughly mixed therewith, such as by mixing both together by a rapidly moving, bladed-cage mixer for about two minutes, to provide a relatively nonpourable, tacky, wet blend.

A blend of mixed oxide fine particles, consisting essentially of minus 325 mesh (U.S. Sieve Series) alumina particles and ferric oxide reagent-grade fine powder of less than 2 micron size in about a 74:4 ratio by weight, respectively, is preprepared by muller-mixing the two oxides together for about 20 minutes. About 340 parts by weight of this preprepared blend of mixed oxide fine particles is added to the just-prepared abrasive/phosphoric acid blend and mixed therewith until uniformly and completely mixed therein, as by mixing together both blends in a container by a rapidly moving bladed-cage mixer for about two minutes, to provide a relatively dry, pourable and flowable, molding composition.

EXAMPLE B

A blend of abrasive and phosphoric acid is prepared by mixing about 953 parts by weight of NO. 60 grit-size alumina and 90 parts by weight of aqueous 85 percent orthophosphoric acid together until the alumina grit appears to be well wetted by and thoroughly mixed with the phosphoric acid. A blend of mixed oxide particles is prepared generally as described in the previous example by muller-mixing together minus 325 mesh (U.S. Sieve Series) alumina particles and ferric oxide reagent grade fine powder of minus 2 micron size in about 74:4 ratio of parts by weight, respectively. About 300 parts by weight of this blend of mixed oxide particles then is added to the just-prepared abrasive/phosphoric acid blend and mixed therewith until uniformly and completely mixed therein to provide a relatively dry, pourable, and flowable, molding composition.

EXAMPLES C TO H

There are prepared additional relatively dry, pourable, and flowable, molding compositions for cold pressing of abrasive bodies in the manner substantially as described in the previous examples. The following table I sets forth illustrative and representative formulations of these prepared molding compositions:

TABLE I.—MOLDING COMPOSITION FORMULATIONS [1]

| Example | C | D | E | F | G | H |
|---|---|---|---|---|---|---|
| Abrasive/phosphoric acid blend: | | | | | | |
| No. 60-grit size alumina | 72.2 | | | | | 71.7 |
| No. 36-grit size alumina | | 72.2 | | | | |
| No. 60-grit size silicon carbide | | | 59.2 | 46.4 | 64.2 | |
| 85% aqueous phosphoric acid | 7.6 | 7.6 | 11.5 | 7.2 | | 5.9 |
| Phospholeum [2] | | | | | 7.5 | |
| Mixed oxides blend: | | | | | | |
| −325 mesh alumina particles | 14.8 | 17.0 | 25.7 | 45.4 | 26.9 | 20.1 |
| Finely divided ferric oxide (less than 2 micron size) | 3.3 | 1.0 | 2.2 | 1.0 | 1.4 | 2.3 |
| Other: expanded perlite (minus 20 mesh) | 2.1 | 2.2 | 1.4 | | | |

[1] Parts by weight.
[2] Registered trademark of Monsanto Chemical Company for a 105% phosphoric acid consisting essentially of an equilibrium mixture of about 58 percent by weight of orthophosphoric acid, 38 percent by weight of pyrophosphoric acid, 3.5 percent by weight of tripolyphosphoric acid, and a trace of higher polymer acids.

Each of the molding compositions of the preceding examples, is processed by cold-pressing, precuring, and final curing to provide a useful abrasive body held together by a water-insoluble phosphate binder. In general this further processing includes pouring a precalculated weighed amount of molding composition into a suitable mold cavity and spreading it therein to a layer of relatively uniform thickness. The employed precalculated weighed amount of molding composition is that supplying an amount of abrasive grit particles calculated on a volume basis to provide the particular abrasive grit loading desired in the cold-pressed interim abrasive body. Generally tool steel cylinders of appropriate inside diameter are employed for the mold in which to prepare wheel-like abrasive bodies, such as 3-inch thick grinding wheels having an O.D. of 18 inches and an I.D. of 14 inches. If desired, the surfaces of the mold, contacting the molding compositions, can be coated with a silicone mold release agent. The employed cold-pressing means is a hydraulic press of appropriate capacity utilizing a single ram to apply pressure and to compact the molding composition to that predetermined stop providing a cold-pressed mass of the desired thickness. Following the cold-pressing, in the instance of the molding compositions of examples A and B, the mold center core and shell are removed, and the mass precured and final cured. For the molding compositions of the other Examples C through H, depending on the particular compaction and density of the cold-pressed mass and the like, precure is accomplished with the cold-pressed mass within or out of the mold, as desired. In those instances where the precure was accomplished with the cold-pressed mass within its mold, following the precure operation, the mold core and shell are removed, and the pressed mass is subjected to the final curing. In the instance of examples A and B, compositions cold-pressed to a 48 percent by volume loading of abrasive grit particles, the precure is accomplished by placing the cold-pressed mass in a preheated (170° F. to 250 ° F.) oven equipped with electrical resistance heating elements. In the precuring of the other compositions, in some the employed oven was cold, in others the oven is at precure temperature when the cold-pressed mass is placed in the oven for precure. In most instances a standardized precure of 1-½ to 2 hours at 170° F. to 190° F. is employed.

Following precuring of the cold-pressed masses, each is finally cured. In the instance of the example A precured mass, the heat in the oven is increased so that the mass heats at the rate of about 100° F. per hour to 650° F., this 650° F. temperature held for about 4 hours, and the mass removed from the oven (or removed after allowing the oven to cool to a lower temperature as desired). In other instances, the precured mass, without its mold is left in the oven, or placed in a cold or moderate-temperature oven and its temperature raised gradually, or in stepwise increments, at a rate no greater than 600° F. per hour and usually at a rate of about 100° F. per hour to a temperature of at least 600° F. and held above this temperature for at least 2 hours, and usually at 650° F. for about 4 hours. Higher final curing temperatures also are useful, but are not necessary to provide formation of the water-insoluble phosphate binder. Temperatures above about 1200° F. generally are avoided as abrasive bodies cured above that temperature are of no greater or of lower strength than are obtainable when the final curing is accomplished within the range of 600° F. to 1200° F.

Numerous abrasive bodies in the form of cylindrical tensile specimens, ¾ inch diameter by ¾ inch thick, are prepared, as just described, from the molding compositions of examples A to H. After final curing and cooling to room temperature their diametrical tensile strengths are determined in substantial accordance with the teachings in Materials Research and Standard, Apr. 1963, pages 283–88. Additional abrasive bodies after final curing and cooling to room temperature are soaked in hot (180° F.) water for two hours, air dried, and their tensile strengths then determined to establish that the binder holding together the abrasive particles therein be substantially water-insoluble. The following table II presents illustrative and representative tensile strength date obtained on grinding specimens, so prepared and evaluated, of the molding compositions of examples A and B containing about 48 percent by volume of the abrasive grit particles.

TABLE II.—DIAMETRICAL TENSILE STRENGTHS (P.S.I.)

| Abrasive body composition | As cured | | After hot H₂O soaking | |
|---|---|---|---|---|
| | Range | Average | Range | Average |
| Example A | 1,250–1,340 | 1,290 | 1,320–1,430 | 1,370 |
| Example B | 1,130–1,280 | 1,225 | 1,140–1,320 | 1,220 |

Abrasive bodies are prepared, as just described, in the form of cylinders 3-inches diameter by 3-½-inches high. These bodies then are sectioned by a ceramic cutting wheel into four sliced samples. Section A designating that cut closest to the hydraulic ram, section B designating that cut about ¼ way down, section C designating that cut about ¾ way down, and section D designating that cut nearest the bottom or platen. The porosity of these specimens then is determined by a procedure involving determining the weights of dry and water-saturated specimens of each suspended in air and in water. The following table III presents illustrative and representative porosity measurements on specimens, so prepared and evaluated, of the molding compositions of examples A and B containing about 48 percent by volume of the abrasive grit particles.

Table III

POROSITY (PERCENT BY VOLUME)

| Abrasive Body Composition | A | C | B | D | Variation | Average |
|---|---|---|---|---|---|---|
| Example A | 27.3 | 28.6 | 27.6 | 0.0 | 2.7 | 28.4 |
| Example B | 30.1 | 30.3 | 31.0 | 32.6 | 2.5 | 31.0 |

As a general rule, sections closest to the single plunger ram had the least porosity and those furthermost removed had the most porosity with the porosity relatively uniform throughout the body and varying throughout by less than 3 percent. With a cold-pressing apparatus employing dual acting plunger rams for cold-pressing of the molding composition therebetween, considerably less variation of porosity would be expected throughout the abrasive body.

Grinding evaluations are made of ¾ inch diameter by ¾ inch thick cured abrasive bodies on hot-rolled steel. The evaluation procedure included surface grinding of a 11-¼ inch O.D. by ¼ inch thick hot-rolled steel ring rotating at 1800 r.p.m. with 3 abrasive bodies equally spaced and held against the metal ring surface under a constant load. The following table IV presents illustrative and representative grinding evaluation data on abrasive bodies, so prepared and evaluated, of the molding compositions of examples A and B containing about 48 percent by volume of the abrasive grit particles. For comparison purposes table IV also presents similarly obtained data on representative samples of a commercially available abrasive body made up of 48 percent by volume of alumina abrasive grit particles held together by an infusible-resinoid binder.

TABLE IV.—GRINDING EVALUATION

| Specimen | Volume of metal removed, cm.³ | Total volume loss of grinding specimens, cm.³ | Time, min. | Grinding ratio |
|---|---|---|---|---|
| Commercial abrasive body | 1.50 | 3.92 | 2.5 | 0.38 |
| Example A composition | 2.14 | 3.03 | 3.0 | 0.71 |
| Example B composition | 2.60 | 1.84 | 3.0 | 1.41 |

The significant green strengths obtainable in the interim abrasive bodies after cold-pressing and precuring through employing finely divided ferric oxide in the molding composition are illustrated by the following preparation of specimens and measurement of their crushing strengths. For this evaluation there is employed the molding composition formulation of example H, which included a mixed oxides blend of 20.1 parts by weight of -325 mesh alumina particles and 2.3 parts by weight of less than 2 micron size ferric oxide. For comparison therewith there is used a like formulation, except devoid of ferric oxide and containing an additional 2.3 parts by weight of -325 mesh alumina particles therefor so that its included mixed oxides blend consisted essentially of 22.4 parts by weight of -325 mesh alumina particles. In all other respects this like comparison formulation is identical in components and their amounts and is prepared in the same way as the example H molding composition formulation. Test specimens, 1-¼ inches diameter by 2 inches high, are prepared by cold-pressing 206 grams of molding composition to a top with 10 cold-pressed specimens prepared from each of the example H formulation, which contained ferric oxide, and the comparison formulation, which is devoid of ferric oxide. Crushing strengths of five cold-pressed specimens of each formulation are determined within one-half hour after cold-pressing. The remaining five each cold-pressed specimens of each formulation within one hour of their cold-pressing are precured at 180° F. for two hours and, after being permitted to cool to about 75° F., their crushing strengths also are determined. In determining crushing strengths of test specimens, each is placed upright on a firm supporting surface and its top surface loaded at a rate of about 400 pounds per minute applied by means of a Dillon Testing Machine until the specimen broke or crushed. The following table V presents a tabulation of the determined crushing strengths on the cold-pressed and the precured specimens of the example H molding composition formulation and of the like comparison formulation.

TABLE V.—SPECIMEN CRUSHING STRENGTHS (P.S.I.)

| Specimen formulation [1] | Cold-pressed Specimens | | Precured [2] specimens | |
|---|---|---|---|---|
| | Range | Average | Range | Average |
| Example H (contains $Fe_2O_3$) | 83–110 | 93 | 2,340–3,420 | 2,890 |
| Comparison (devoid of $Fe_2O_3$) | 37–47 | 42 | 154–173 | 166 |

| | Example H | Comparison |
|---|---|---|
| No. 60 grit size alumina | 71.7 | 71.7 |
| 85% aqueous phosphoric acid | 5.9 | 5.9 |
| –325 mesh alumina particles | 20.1 | 22.4 |
| Less than 2 micron ferric oxide | 2.3 | |

[1] Parts by weight:
[2] Precured at 180° F. for two hours.

From the data presented in table V it is readily apparent that cold-pressed bodies of molding composition formulations containing finely divided ferric oxide exhibit crushing strengths of the order of at least twice those of cold-pressed bodies of molding compositions lacking finely divided ferric oxide therein. The significantly higher strengths of the cold-pressed specimens of the example H formulation likely can be attributed to reaction in part of their iron oxide content with phosphoric acid at normal temperatures (e.g., about 75 ° F.) to form a tacky phase of some iron phosphates which imparts some bonding and increased strength to the cold-pressed specimens. It further should be apparent that the cold-pressed bodies, after precuring, of molding composition formulations containing finely divided ferric oxide exhibit crushing strengths of the order of about 15 to 20 times the crushing strengths of cold-pressed bodies, after precuring, of like molding composition formulations not containing finely divided ferric oxide.

While the invention has been described in detail herein, it is apparent that various changes and modifications thereof will be obvious to those skilled in the art, and it is intended that all such obvious changes and modifications be within the true spirit of the invention and be encompassed within the appended claims.

We claim:

1. A process for preparing an abrasive body consisting essentially: a. preblending from 25 to 15 parts by weight of minus 325 mesh alumina particles with ferric oxide particles of less than 3 microns size in an amount of at least 0.4 part by weight and up to ⅓ the parts of the minus 325 mesh alumina particles; b. preblending from 62 to 78 parts by weight of abrasive grit particles selected from grit-size particles of alumina and silicon carbide with from 11 to 6 parts by weight of phosphoric acid of a free water content of less than 3 percent by weight of the molding composition; c. thoroughly mixing of the two preblends with each other to provide a molding composition; d. cold-pressing the molding composition within 12 hours of its preparation into a desired shape configuration; and e. finally curing the precured interim body by raising its temperature at a rate no greater than 600° F. per hour to 600° F. and maintaining at a temperature of at least 600° F. and not above 1200° F. for at least two hours.

2. A molded abrasive body containing abrasive grit particles held together by a water-insoluble phosphate binder and prepared from the composition which for each 100 parts by weight comprises: a. from 90 to 30 parts by weight of abrasive grit particles selected from grit-size particles of alumina and silicon carbide; b. from 3 to 21 parts by weight of phosphoric acid; c. from 6 to 46 parts by weight of minus 325 mesh alumina particles; and d. finely divided ferric oxide in an amount of at least 0.4 part by weight and up to about one-third the parts of the minus 325 mesh alumina particles.

3. A molded abrasive body containing abrasive grit particles held together by a water-insoluble phosphate binder and prepared from the composition which for each 100 parts by weight comprises: a. from 62 to 78 parts by weight of abrasive grit particles selected from grit-size particles of alumina and silicon carbide; b. from 11 to 6 parts by weight of phosphoric acid whose free water content constitutes less than 3 percent by weight of the composition; c. from 25 to 15 parts by weight of minus 325 mesh alumina particles; and d. from 2 to 1 parts by weight of less than 3 micron size ferric oxide particles.

4. A process for preparing an abrasive body consisting essentially: a. preblending from 25 to 15 parts by weight of minus 325 mesh alumina particles with ferric oxide particles of less than 3 micron size in an amount of at least 0.4 part by weight and up to ⅓ the parts of the minus 325 mesh alumina particles; b. preblending from 62 to 78 parts by weight of abrasive grit particles selected from grit-size particles of alumina and silicon carbide with from 11 to 6 parts by weight of phosphoric acid of a free water content of less than 3 percent by weight of the molding composition; c. thoroughly mixing of the two preblends with each other to provide a molding composition; d. cold-pressing the molding composition within 12 hours of its preparation into a desired shape configuration; e. precuring the desired shaped configuration at a temperature between 170° F. to 250° F. for ¾ to 3 hours; and f. finally curing the precured interim body by raising its temperature at a rate no greater than 600° F. per hour to 600° F. and maintaining at a temperature of at least 600° F. and not above 1200° F. for at least 2 hours.

5. The method of claim 4 in which the abrasive grit particles are alumina and the phosphoric acid is orthophosphoric acid.

6. A mixed cohesive molding composition for cold-pressing and subsequent heat-curing to become an article containing abrasive grit particles held together by a water-insoluble phosphate binder, which for each 100 parts by weight of the composition comprises: a. from 90 to 30 parts by weight of abrasive grit particles selected from grit-size particles of alumina and silicon carbide; b. form 3 to 21 parts by weight of phosphoric acid; c. from 6 to 46 parts by weight of minus 325 mesh alumina particles; and d. finely divided ferric oxide in an amount of at least 0.4 part by weight and up to about one-third the parts of the minus 325 mesh alumina particles.

7. A mixed cohesive molding composition for cold-pressing and subsequent heat-curing to become an abrasive body containing abrasive grit particles held together by a water-insoluble phosphate binder, which for each 100 parts by weight of the composition comprises: a. from 62 to 78 parts by weight of abrasive grit particles selected from grit-size particles of alumina and silicon carbide; b. from 11 to 6 parts by weight of phosphoric acid whose free water content constitutes less than 3 percent by weight of the composition; c. from 25 to 15 parts by weight of minus 325 mesh alumina particles; and d. from 2 to 1 parts by weight of less than 3 micron size ferric oxide particles.